Jan. 14, 1964

A. W. BROWN 3,117,686

BACK HOE EXCAVATOR

Filed Aug. 1, 1960

INVENTOR.
ARCHER W. BROWN
BY
Braddock and Braddock
ATTORNEYS

Jan. 14, 1964    A. W. BROWN    3,117,686
BACK HOE EXCAVATOR
Filed Aug. 1, 1960    7 Sheets-Sheet 2

INVENTOR.
ARCHER W. BROWN
BY
Braddock and Braddock
ATTORNEYS

Jan. 14, 1964  A. W. BROWN  3,117,686
BACK HOE EXCAVATOR
Filed Aug. 1, 1960  7 Sheets-Sheet 5

INVENTOR.
ARCHER W. BROWN
BY
Braddock and Braddock
ATTORNEYS 3,117,686
BACK HOE EXCAVATOR
Archer W. Brown, Minneapolis, Minn., assignor to American Hoist & Derrick Company, St. Paul, Minn., a corporation of Delaware
Filed Aug. 1, 1960, Ser. No. 46,552
11 Claims. (Cl. 214—138)

This is a continuation-in-part of the application of Archer W. Brown, for Back Hoe Excavator, Serial No. 731,793, filed April 29, 1958, now abandoned.

This invention presents an improvement over the structure of a usual back hoe excavator including a boom pivotally mounted on a platform for swinging movement in a vertical plane and a back cutting dipper mounted through a dipper stick to an outer end portion of said boom for swinging movement in a vertical plane and inward and outward movement toward and away from the platform.

The invention herein has relation to apparatus for locking the boom with respect to the platform to bring the weight of substantially the entire back hoe excavator to bear on the dipper to increase the force of penetration of the dipper cutting element or digging teeth when such digging forces are being exerted; and for allowing free and unlocked pivotal movement of the boom with respect to the platform at all other times.

This is done by providing a boom control assembly mounted with respect to said platform and said boom, by providing means to lock said assembly to prevent upward movement of said boom with respect to said platform responsive to operation of said excavator to cause said dipper to exert digging forces, and means for the unlocking of said assembly to permit free pivotal movement of said boom with respect to said platform responsive to operation of said excavator to cause said boom to be elevated by the mechanism of the excavator.

Referring to a first form of the invention illustrated in FIGS. 1 through 10 of the drawings and the numerals of reference thereon, a cab 20 of a back hoe crane is rigid with a platform 22 suitably and conveniently revolvably supported upon crawlers 21.

Figure 1:
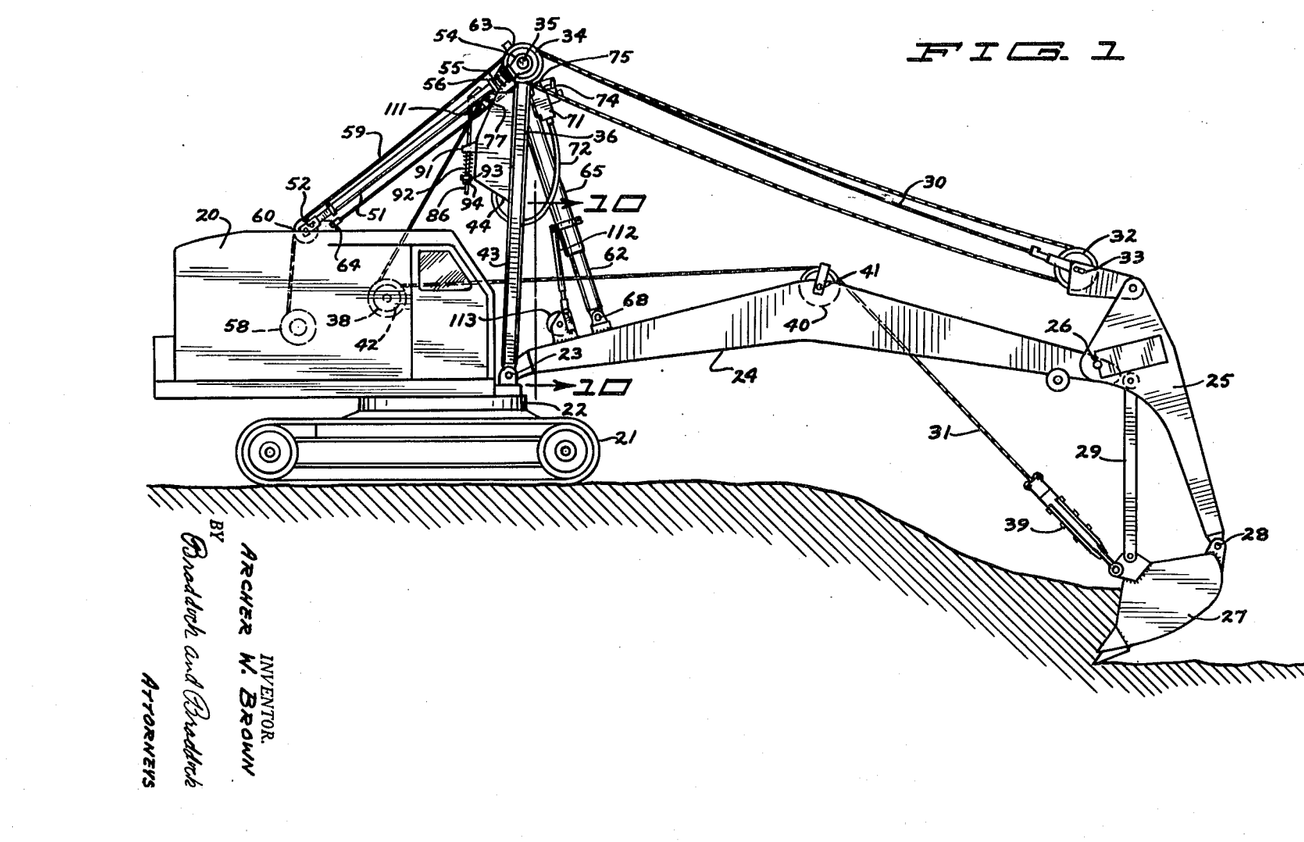
FIG. 1 is a side elevational view of a back hoe excavator made according to a first form of the present invention.

The revolvable platform 22 pivotally supports, as at 23, a back hoe boom 24. A back hoe stick 25 is pivotally mounted, as at 26, on an outer end portion of the boom. A dipper 27 is pivotally mounted, as at 28, on the lower end of said back hoe stick, and a pitch brace 29 is pivotally connected between the back hoe stick and a portion of the dipper 27 in spaced relation to its pivotal support 28. The boom 24, stick 25, dipper 27 and pitch brace 29 are swingable in vertical planes.

Digging, hoisting and dumping operations are controlled through the instrumentality of a pull-back line 30 and a drag line 31. The pull-back line 30 rides sheaves 32 rotatably mounted, as at 33, on an end of the back hoe stick 25 spaced from the dipper 27, and also rides sheaves 34 rotatably mounted, as at 35, on the upper end of a mast assembly 36 itself suitably and conveniently pivotally supported, as at 23, on the platform 22 for swinging movement in vertical planes. A pull-back drum 38 is for reeling the pull-back line 30 in and out. The drag line 31 is secured, as at 39, to a portion of the dipper 27 adjacent to the pitch brace 29 and rides a sheave 40 rotatably mounted, as at 41, on an intermediate portion of the boom 24. A drag line drum 42 coaxially alined with the pull-back drum 38 is for reeling the drag line 31 in and out. Suitable controls (not shown) for the pull-back and drag line drums of course will be employed.

Figures 9, 10:
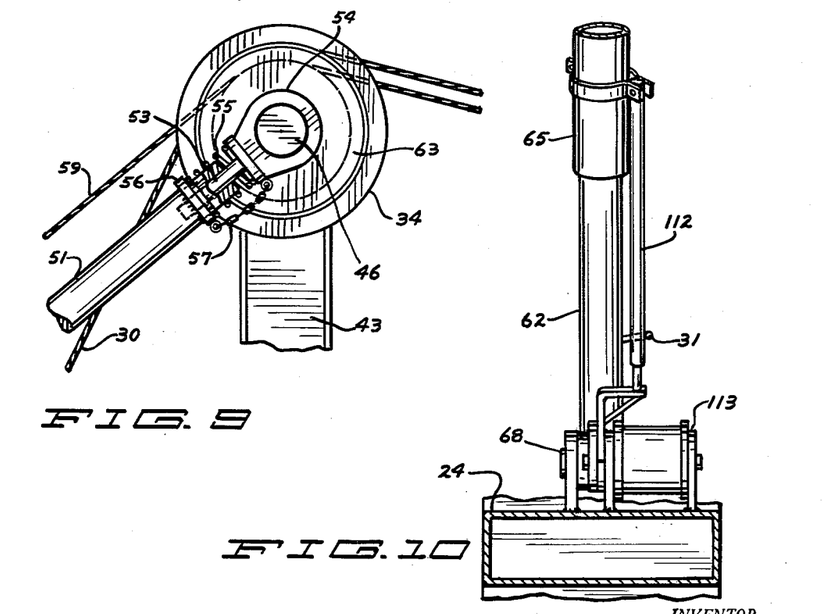
FIG. 9 is a fragmentary side elevational view showing relationship of a mast, supporting strut, sheave axle and sheaves at the peak of the mast.
FIG. 10 is a fragmentary vertical sectional view taken on the line 10—10 in FIG. 1.

Mast assembly 36 includes a pair of rigid upright supports 43, 43 rigidly jointed together with an airtight hydraulic reservoir 44 that also serves as a reinforcement. Each of the supports 43 holds a sleeve 45 through which a sheave shaft 46 is rotatably mounted. A strap 47 is fastened to ears 50, 50 which are fixedly attached to sleeves 45, 45 and retains the cables on the sheaves.

A back brace is constituted as spaced, upwardly extending tubes 51, 51 having their lower ends pivotally supported, as at 52, on the cab for swinging movement in vertical planes. A shank 53 is slidably telescoped into each of tubes 51 and has an integral ear 54 pivotally mounted over sheave shaft 46 adjacent the outer end thereof. A compression coil spring 55 is mounted between a collar 56 attached to each tube and its respective ear 54. A removable chain 57 holds each of the ears 54 from coming out of the tube into which it is telescoped when in use and permits disassembly of the back brace to allow the mast and back brace to be folded flat as is necessary for transport.

A boom hoist drum 58 is supported on the platform 22 and a boom hoist line 59 passes from said boom hoist drum upwardly over a guide sheave 60 mounted on cab 20, over hoist sheave 63 on shaft 46, back downwardly and is fastened to cab 20 as at 64. Suitable controls for the boom hoist drum will be employed.

A hydraulic cylinder 65 is pivotally mounted to mast assembly 36 as at 66 and extends downwardly and forwardly. A rod portion 62 of a piston 67 slidably fitted in said hydraulic cylinder is pivotally secured, as at 68, to a portion of the boom 24 between the boom pivot 23 and drag line sheave 40.

Figures 2, 3:
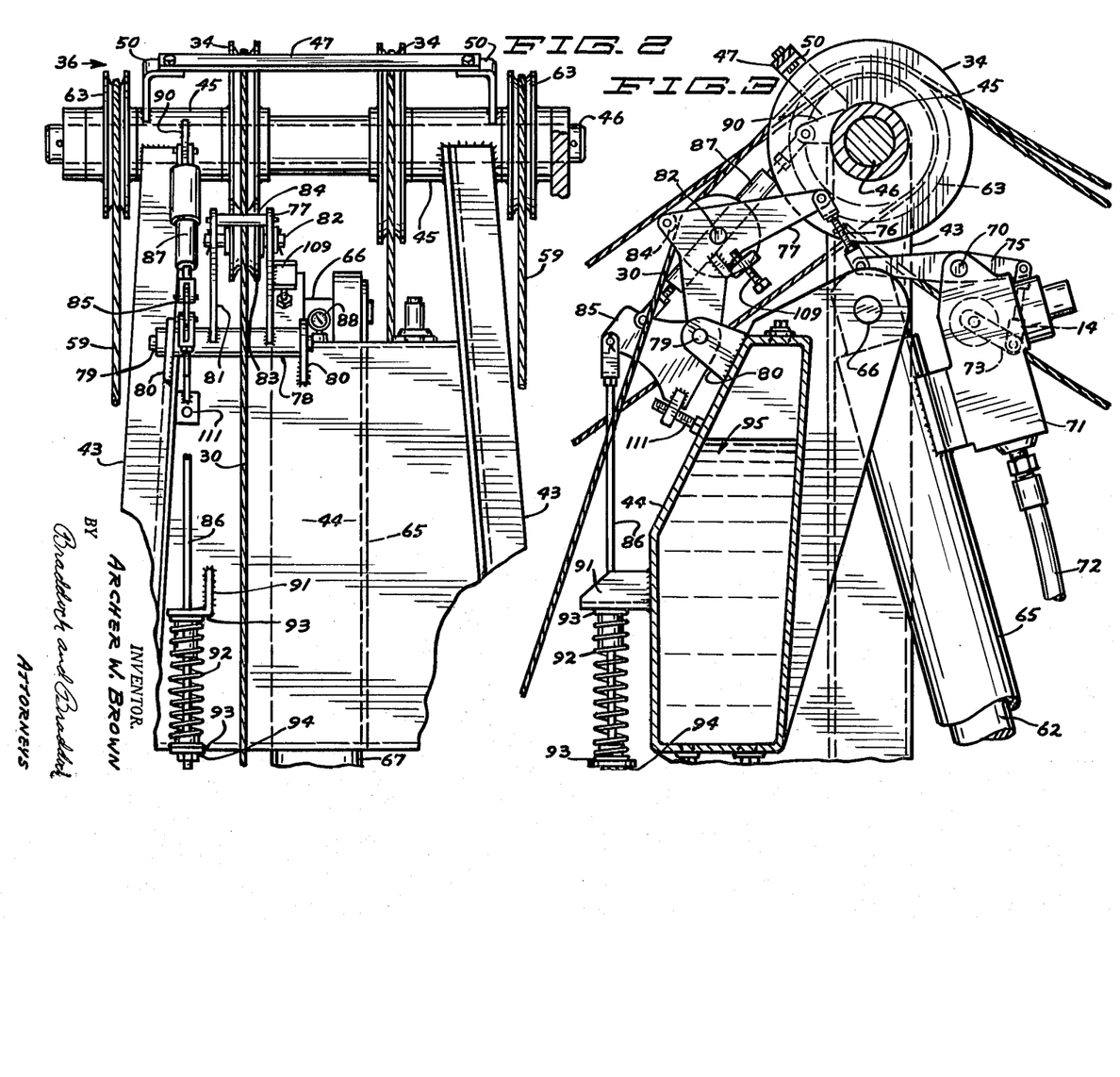
FIG. 2 is an enlarged fragmentary view of a top portion of the structure of FIG. 1 as seen from the left in that figure.
FIG. 3 is an enlarged, longitudinal vertical sectional view of a portion of the apparatus of FIG. 1 with parts in section and parts broken away showing a boom control assembly in its locked position.
Figure 4:
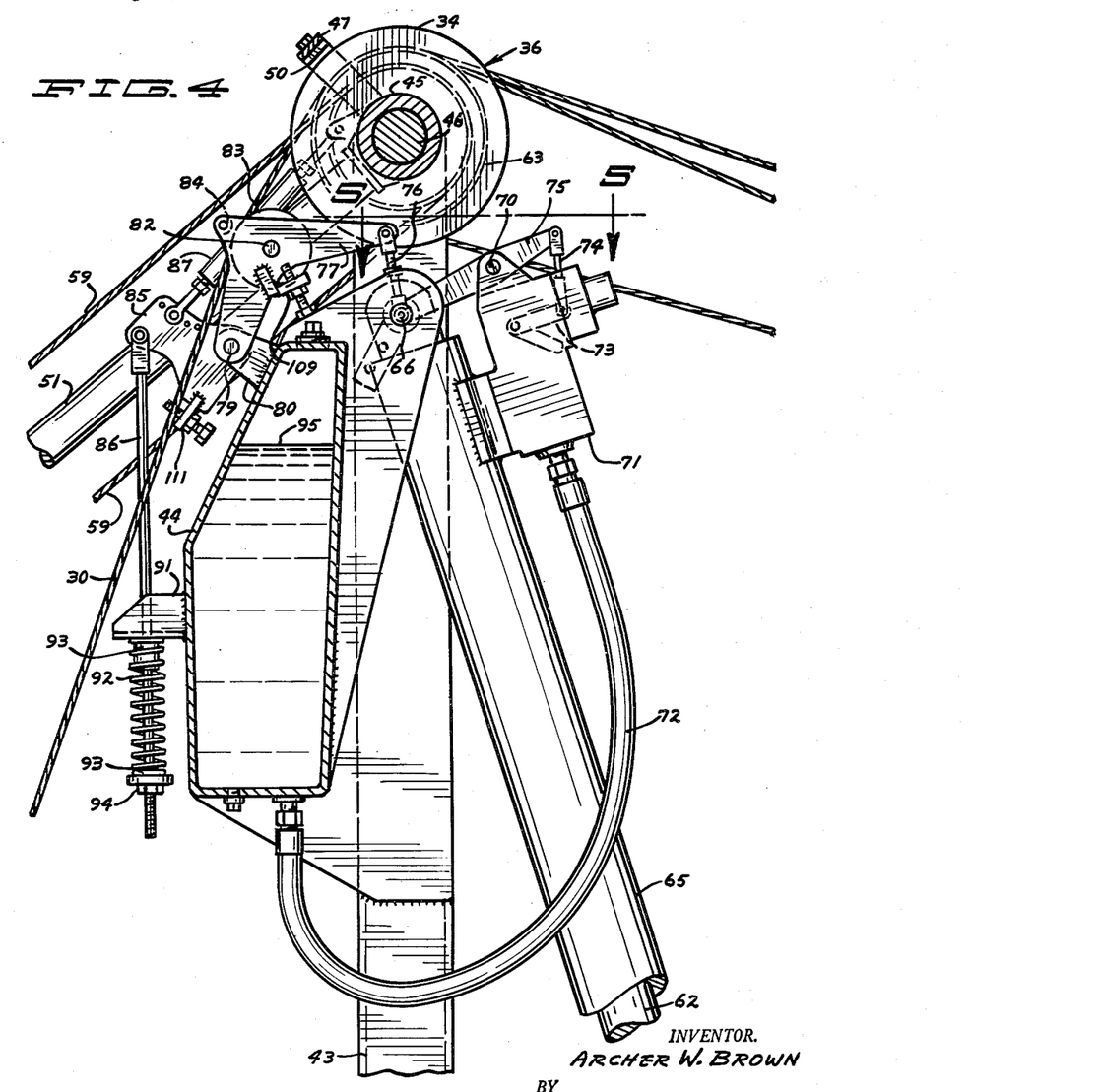
FIG. 4 is a view of the mechanism of FIG. 3 but showing the boom control assembly in its unlocked position.
Figures 5, 6:
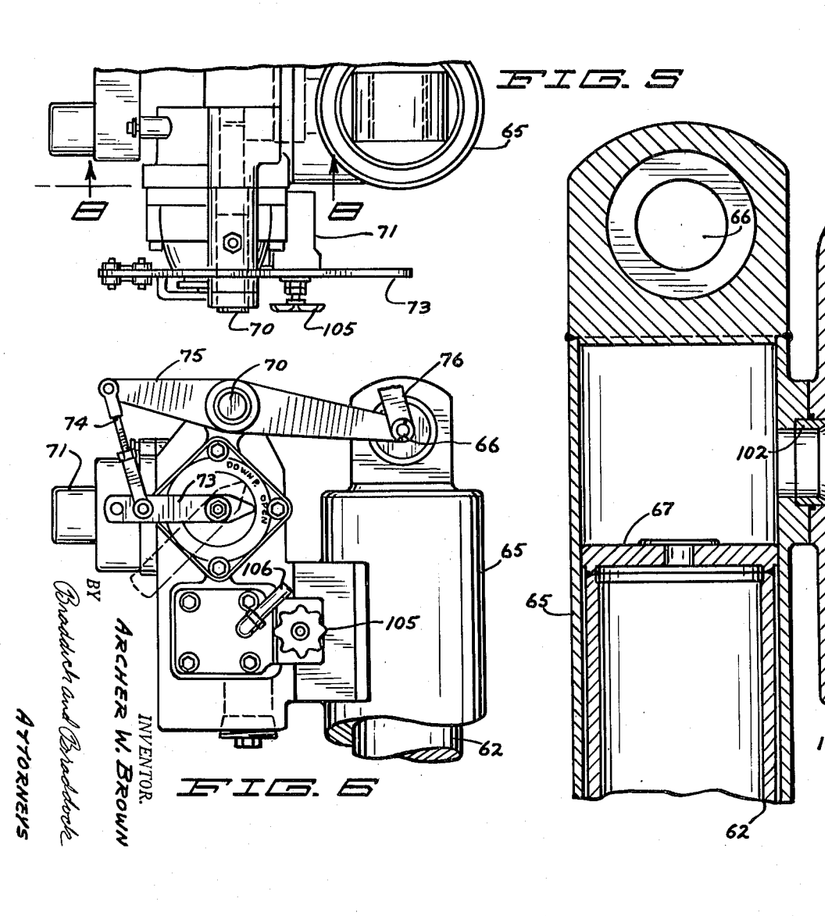
FIG. 5 is a fragmentary top plan view of a portion of the boom control mechanism taken substantially on the line 5—5 in FIG. 4 but with parts broken away.
FIG. 6 is a fragmentary vertical side elevational view of the apparatus of FIG. 5 as seen from below that figure.

A rotary hydraulic valve assembly 71 is mounted onto the upper end of cylinder 65. A hydraulic hose 72 provides passage for hydraulic fluid between valve 71 and reservoir 44. Valve assembly 71 has a control lever 73 which is operated by a first link 74 pivotally mounted thereto. A lever 75 is pivotally mounted as at 70 on the upper end of valve assembly 71 and is pivotally connected at a first end thereof to first link 74 and has a second link 76 pivotally connected to a second end thereof. Second link 76 is also pivotally attached to a bell crank 77. Bell crank 77 is fixedly attached to a tube 78 that pivots on a shaft 79 which is supported by a pair of ears 80, 80 that are fixedly attached to an outer wall of hydraulic reservoir 44. A support plate 81 is fixedly attached to tube 78 and is spaced from bell crank 77. A shaft 82 is supported by the bell crank and plate and extends between them. A guide sheave 83 for the pull-back cable is rotatably mounted on shaft 82. A cable retainer 84 also is fastened between bell crank 77 and plate 81.

An actuator plate 85 is fixedly attached to tube 78 and has a downwardly extending spring rod 86 pivotally mounted adjacent a lower edge thereof and a shock absorber 87 pivotally mounted adjacent an upper edge. Shock absorber 87 extends upwardly and is pivotally mounted on an ear 90 that is fixedly attached to one of the sleeves 45 on a support 43 for the mast assembly.

Spring rod 86 extends downwardly from plate 85 through a provided hole in a spring retainer 91 that is fixedly attached to hydraulic reservoir 44. A valve actuating compression coil spring 92 is slipped over the portion of spring rod 86 that extends below retainer 91 and is held centered thereon with collars 93, 93. A nut 94 is threadably mounted on spring rod 86 and provides means for adjusting the amount of downward force exerted by spring 92 on the spring rod and the actuator plate.

Hydraulic valve assembly 71 is used to control the flow of oil to and from hydraulic cylinder 65. Hydraulic fluid represented by dotted lines as at 95 is contained under a pressure of about 60 p.s.i. in the hydraulic reservoir. A pressure gauge 88 is mounted on the reservoir to enable the operator to observe the pressure therein. The fluid in the reservoir is urged by this pressure through hose 72 to valve assembly 71.

Figure 7:
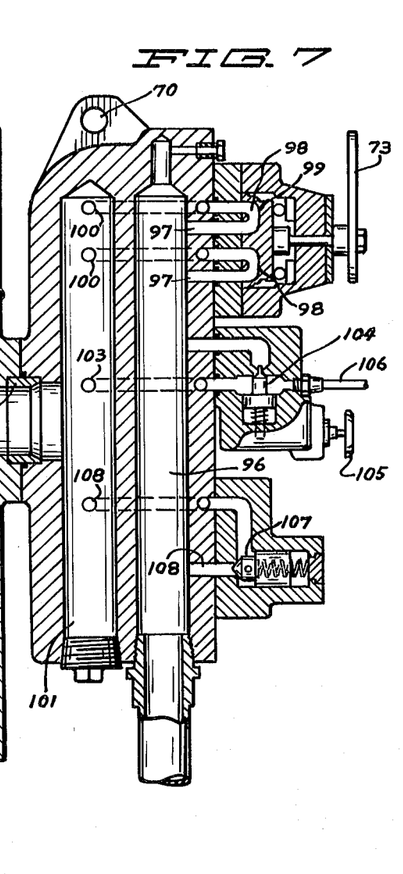
FIG. 7 is a diagrammatic view of the valving of the boom locking mechanism.

Referring particularly to FIG. 7 which is a diagrammatic picture of the internal porting of the valve, hose 72 is connected to a low pressure chamber 96. In the open position, as shown, valve ports 97, 97 are alined with ports 98, 98 in a rotatable valve block 99. Ports 98, 98 in turn aline with passageways 100, 100 that are open to a high pressure chamber 101. High pressure chamber 101 is connected to the interior of hydraulic cylinder 65 by a connector sleeve 102. In the closed position of the valve (not shown in FIG. 7) the high pressure chamber is sealed from the low pressure chamber by the rotation of valve block 99 to a position where ports 98 and 97 no longer aline. A relief port 103 is open to high pressure chamber 101 and a relief valve 104 is provided to allow hydraulic fluid to flow back through the low pressure chamber to the reservoir when the pressure in the hydraulic cylinder reaches a predetermined level. The pressure at which the relief valve opens may be adjusted by rotating an external handle 105. A pressure line 106 may be provided for a high pressure gauge (not shown).

Figure 8:
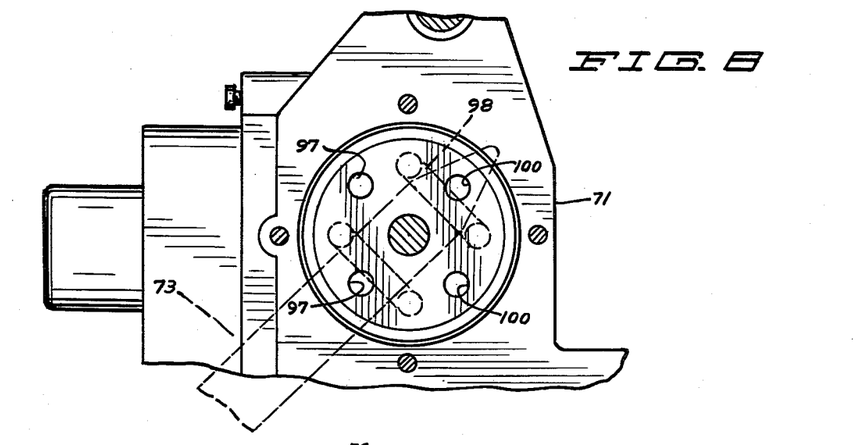
FIG. 8 is an enlarged vertical sectional view taken on the line 8—8 in FIG. 5 showing the true relationship of the ports in the valving mechanism.

A one way check valve 107 in an auxiliary port 108 is provided to allow rapid filling of the hydraulic cylinder when the piston 67 moves downwardly but prevents oil in the cylinder from returning to the reservoir when the cylinder is under pressure or is tending to be compressed. FIG. 8 is a true view of the ports in the rotary valve with the valve in its closed position. Ports 97, 97 and passage ways 100, 100 are no longer connected by ports 98, 98 shown by dotted lines in this figure. This prevents flow of oil to or from the cylinder through these ports.

Control of the operating mechanism of the back hoe is accomplished by use of the pull-back line 30 and the drag line 31. Tension will be maintained in the pull-back line 30 during the hoisting, dumping and lowering of the dipper 27 and will cause actuator sheave 83 to move forwardly under this tension to a position as illustrated in FIG. 4. Bell crank 77 will come to rest against an adjustable stop 109 and the rotarry valve block 99 will be moved to the open position through the action of lever 75 and the connecting links. In this position the pivot point between the second end of lever 75 and second link 76 alines with the pivot 66 of hydraulic cylinder 65. This allows the hydraulic cylinder to pivot about this point without affecting the valve setting.

With the rotary valve in the open position as described, the hydraulic cylinder and piston with rod assembly may shorten or lengthen freely under the action of the pull-back line to allow the boom to be moved to any position. Oil may flow freely between the cylinder and reservoir through the ports provided in valve assembly 71 and through the hose 72. The pressure of the hydraulic fluid in the hydraulic cylinder will be the same as the pressure in the reservoir and will not affect free extension or retraction of the piston.

Tension on the pull-back line will be released by the operator, desirably at the moment when a provided cutting element 110 of the dipper 27 touches the material to be excavated, during the intervals when the drag line is operative to scoop up loads. Slacking off of the pull-back line will cause the actuator sheave 83 to be released. The compression coil spring 92 will immediately become operative to move the spring rod and the actuator plate 85 to a position with an adjustable stop 111 positioned against the outer surface of the hydraulic reservoir 44 and move the rotarry hydraulic valve block to the closed position as shown in FIG. 3. With the valve in the closed position as previously described, the hydraulic cylinder, containing its entrapped fluid, and the piston with rod assembly will become a substantially rigid member and any upward forces on the boom that result from the action of the drag line on the bucket will be transmitted through the closed cylinder to the mast and back brace and thereby to the platform 22. Under this action a substantial portion of the weight of the entire back hoe unit will be utilized to increase penetration of the dipper in hard ground or other material.

If the force on the piston resulting from the digging increase to a point where the internal pressure within the cylinder exceeds a predetermined level the relief valve 104 in hydraulic valve assembly 71 will open and oil will flow from cylinder 65 through relief port 103 to the low pressure chamber 96 and back to the reservoir. The hydraulic cylinder in this matter will act as a limiting device on the digging force and the relief valve setting will serve to prevent unsafe stresses in the mechanism.

When an operator of a back hoe excavator of the conventional rope reeved type becomes aware, as by lugging down on the engine, too much material is being lifted off during the operation of reeving in the drag line he tensions the pull-back line thus to relieve down pressure. An operator of the back hoe excavator of the rope reeved type incorporating the mechanism of the present invention also will relieve digging pressure by tensioning the pull-back line and thereby moving actuator sheave 83 and the attached linkage to position with the hydraulic valve open so that the cylinder and mast may move to a new position. In short, an operator of a new and improved back hoe excavator will accomplish control of operation thereof in the same manner as do operators of the conventional rope-reeved back hoe excavators.

The shock absorber 87 prevents extremely rapid movement of the actuator plate to which it is attached and the valve operating linkage, and reduces shock loads on the valve as well as eliminating any tendency for valve chatter.

When the drag line 31 is tensioned, it comes to rest against a telescoping guide 112 that is attached between hydraulic cylinder 65 and a guide roller bracket 113 and prevents the drag line from damaging the cylinder or piston during operation.

Referring now to FIGS. 11 through 14 of accompanying drawings and a second form of the present invention contained therein and parts identical with parts in the first form will be identically numbered.

Figure 11:
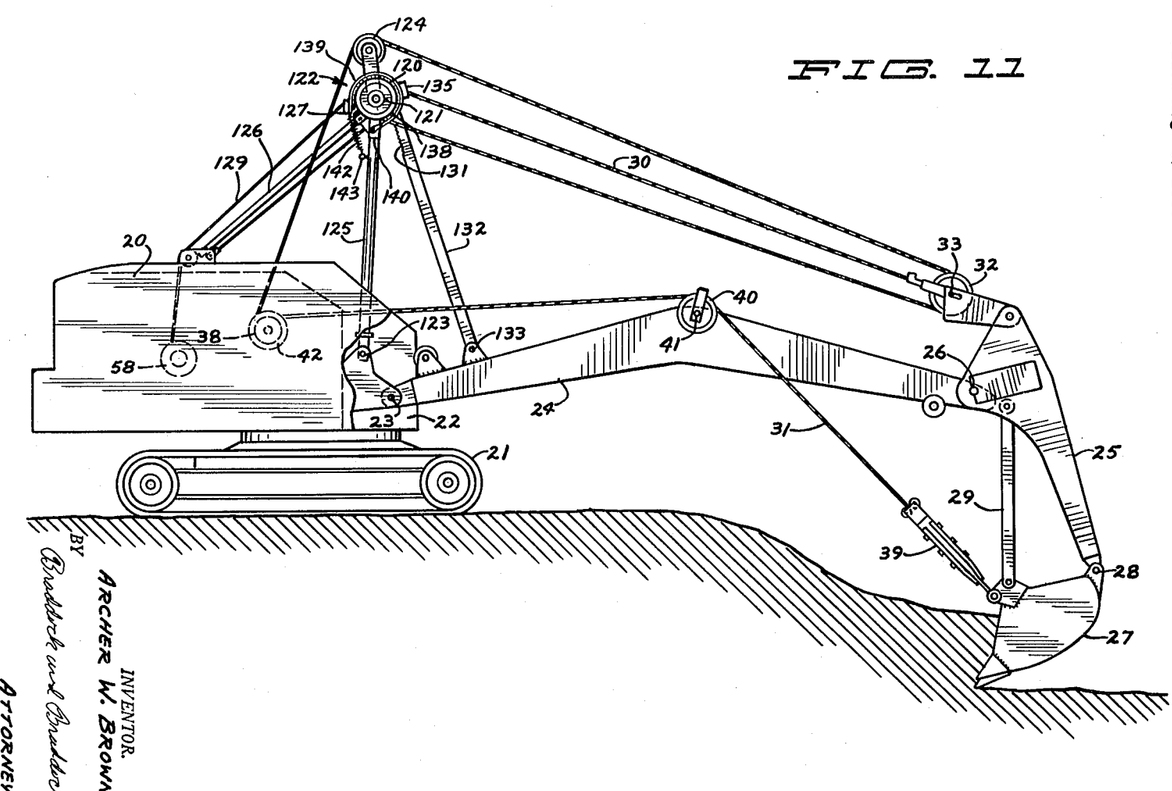
FIG. 11 is a side elevational view of a back hoe excavator made according to a second form of the invention.

The cab 20, platform 22, boom 24, dipper 27 and associated parts are identical with those in the first form.

Digging, hoisting and dumping operations are controlled through the instrumentality of a pull-back line 30 and a drag line 31. The pull-back line 30 rides sheaves 32 rotatably mounted, as at 33, on an end of the back hoe stick 25 spaced from the dipper 27 and also is looped on a guide sheave 120 rotatably mounted on a shaft 121 on the upper end of a mast assembly 122 itself pivotally supported, as at 123, on the platform 22 for swinging movement in vertical planes. Pull-back line 30 rides over an actuator sheave 124 and is attached to a pull-back drum 38 for reeling the pull-back line in and out. The drag line 31 is secured, as at 39, to a portion of the dipper 27 adjacent to the pitch brace 29 and rides a sheave 40 rotatably mounted, as at 41, on an intermediate portion of the boom 24. A drag line drum 42, coaxially alined with pull-back drum 38, is for reeling the drag line 21 in and out. Suitable controls (not shown) for the pull-back and drag line drums of course will be employed.

Figure 12:
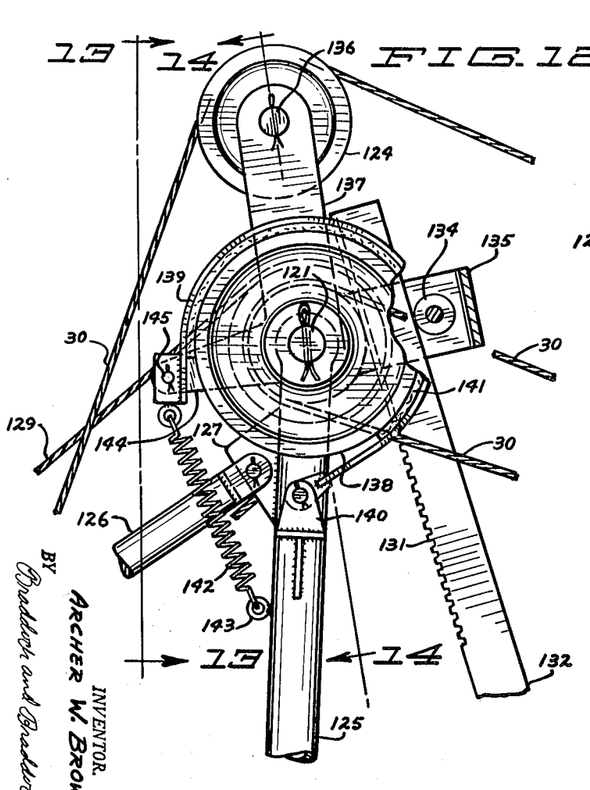
FIG. 12 is an enlarged fragmentary detail view showing the relationship of the boom control assembly to the peak of the mast and the strut of the apparatus of FIG. 11.
Figures 13, 14:
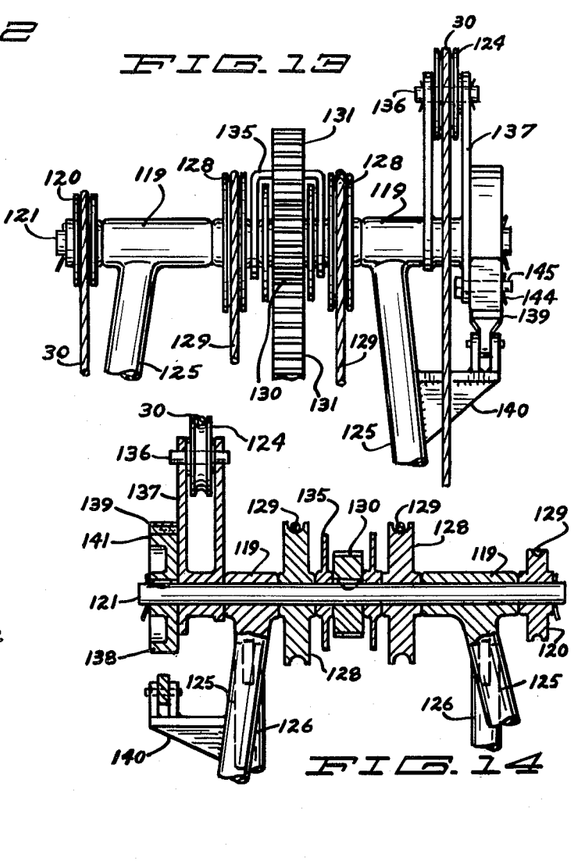
FIG. 13 is a fragmentary vertical view taken on the line 13—13 in FIG. 12.
FIG. 14 is a substantially vertical sectional view taken on the line 14—14 in FIG. 12.

Mast assembly 122 includes a pair of rigid upright supports 125, 125 each of which has a collar 119 aligning with the collar of the other support through which a sheave shaft 121 is rotatably fitted. Two back braces 126, 126 are pinned to ears 127, 127 that are welded to the supports 125, 125. Said braces extend downwardly to cab 20. A pair of hoist sheaves 128, 128 are also rotatably mounted on shaft 121 and serve as guides for a boom hoist cable 129 that is actuated by a boom hoist drum 58.

A pinion gear 130 is drivingly fastened to shaft 121 and engages rack teeth 131 cut into a rigid strut 132 that extends downwardly to pivotally engage boom 24 as at 133. A rack guide roller 134 is mounted in a frame 135 and keeps the rack and pinion engaged when they are under load.

Actuator sheave 124 is rotatably mounted on a pin 136 which is supported by a frame 137 that is rotatably mounted onto shaft 121 and extends upwardly therefrom. A brake drum 138 is drivably attached to shaft 121 adjacent an outer end thereof. A brake band 139 is pivotally mounted at a first end thereof to a bracket 140 extending from a support 145 and is wrapped around the brake drum 138. Suitable friction material 141 is bonded to the brake band 139 and is employed against the drum.

A tension coil spring 142 is attached to a second end of the brake band 139 and extends downwardly to an eye 143 that is fastened to one of the supports 125. Said spring resiliently urges the brake band 139 against the brake drum 138. An arm 144 integral with and extending from sheave bracket 137 is pivotally attached, as at 145, to brake band 139 adjacent said second end and is positioned to act against the spring force when the actuator sheave moves forwardly.

When tension is applied to the pull-back line, as is normally done in the hoisting, dumping and lowering of the dipper 27, the actuator sheave will move forwardly under the tension and arm 144 will be forced up. This will counter-act the force from tension spring 142 and will release the pressure of the brake band on the drum. Shaft 121 will then be free to rotate and boom 24 may move freely up and down as the strut 122 will drive pinion gear 130 and rotate the shaft 121.

When the pull-back line is slacked off, as when the drag line is operated to load the dipper, the spring 142 will immediately clamp the brake band against the drum and the shaft 121 will no longer be free to rotate. Pinion gear 130 will also be unable to rotate and the strut 132 will be held immobile by the rack teeth 131 engaging the pinion. Any tendency of the boom to move upwardly under the digging force will be resisted by strut 132 and the mast assembly 122 as described in the previous form of the invention and a substantial portion of the weight of the back hoe unit may thereby be utilized to increase dipper penetration.

The linkage in this form of the invention is an automatic mechanical method of accomplishing the same result as is done hydraulically in the first form. Both forms of the invention present an improvement that makes a rope reeved back hoe adaptable to a much greater variety of jobs and conditions. When installed on a machine, the mechanism disclosed will increase the digging force from 50 to 150 percent over the conventional machine.

What is claimed is:

1. In a back hoe excavator, the combination with a supporting platform, a boom pivotally mounted on said platform for swinging movement in a vertical plane and extending outwardly from the platform, a dipper with inwardly facing cutting element pivotally supported on and beneath an outer portion of said boom for swinging movement in a vertical plane and inward and outward movement toward and away from said platform, a mast mounted on and extending above the platform, a drag line for reeving in said dipper and a pull-back line for elevating and lowering the boom with dipper, of hydraulically actuated mechanism on said mast and engageable with an intermediate portion of said boom for resisting upward pivotal movement of the boom caused by digging forces exerted on the cutting element of said dipper and means operable in response to slacking off of said pull-back line for rendering said mechanism operative to resist upward movement of said boom, said means further being operable in response to tension in said pull back line to render said mechanism inoperable.

2. In a back hoe excavator, the combination with a supporting platform, a boom pivoted on said platform and extending outwardly therefrom, a first sheave on an intermediate portion of the boom, a stick having an intermediate portion thereof pivoted to an outer end portion of said boom, said boom and stick being swingable in a vertical plane and a lower portion of the stick being swingable toward and away from the platform, a dipper pivoted to said lower portion of the stick and having an inwardly facing cutting element, means pivotally supporting said dipper for swinging movement in a vertical plane toward and away from the boom, a mast with second sheave situated above and supported by said platform, first and second drums on the platform, a drag line on said first drum, extending over said first sheave and secured to an intermediate portion of said dipper and a pull-back line on said second drum, extending over said second sheave and secured to an upper portion of said stick, of hydraulically actuated mechanism on said mast and engageable with an intermediate portion of said boom for resisting upward pivotal movement of the boom caused by digging forces exerted on the cutting element of said dipper and means operable in response to slacking off of said pull-back line for rendering said mechanism operative to resist upward movement of the boom, said means being operable in response to tension in said pull back line for rendering said mechanism inoperable.

3. In a back hoe excavator, the combination with a supporting platform, a boom pivotally mounted on said platform for swinging movement in a vertical plane and extending outwardly from the platform, a dipper with inwardly facing cutting element pivotally supported on and beneath an outer portion of said boom for swinging movement in a vertical plane and inward and outward movement toward and away from said platform, a mast supported by and extending above the platform, a drag line for reeving in said dipper and a pull-back line for elevating and lowering the boom with dipper, of hydraulically actuated mechanism on the mast for resisting upward pivotal movement of said boom caused by digging forces exerted on the cutting element of said dipper comprising a cylinder pivotally supported on said mast, a piston slidable in said cylinder and pivotally secured to an intermediate portion of said boom, a reservoir for hydraulic fluid, a valve casing, a first connection for flow of hydraulic fluid between said reservoir and valve casing, a second connection for flow of hydraulic fluid from the reservoir into said cylinder, a third connection for flow of hydraulic fluid between the cylinder and valve casing, means including a check valve in said second connection for precluding flow of hydraulic fluid from said cylinder and third connection save by way of said valve casing, a valve in the casing operable to a first position permitting flow of hydraulic fluid by way of said casing between said third and first connections and to a second position shutting off flow of hydraulic fluid by way of the casing from the third to the first connection, first means responsive to tensioning of the pull-back line for actuating the valve to said first position and second means operable in response to slacking off of said pull-back line for actuating said valve to said second position.

4. The combination as specified in claim 3 wherein the reservoir contains hydraulic fluid under pressure.

5. In a back hoe excavator, the combination with a supporting platform, a boom pivotally mounted on said platform for swinging movement in a vertical plane and extending outwardly from the platform, a dipper with inwardly facing cutting element pivotally supported on and beneath an outer portion of said boom for swinging movement in a vertical plane and inward and outward movement toward and away from said platform, a mast pivotally supported on said platform for swinging movement in a vertical plane longitudinally of said boom, a back brace pivotally supported in spaced relation to said mast at the side thereof opposite the boom for swinging movement in a vertical plane toward and away from said platform, means detachably securing upper portions of said mast and back brace to each other, a drag line for reeving in said dipper and a pull-back line for elevating and lowering the boom with dipper, of hydraulically actuated mechanism on said mast and engageable with an intermediate portion of said boom for resisting upward pivotal movement of said boom caused by digging forces exerted on the cutting element of said dipper and means operable in response to slacking off of said pull-back line for rendering said mechanism operative to resist upward pivotal movement of said boom, said means being operable in response to tension in said pull back line for rendering said mechanism inoperative to resist upward pivotal movement of said boom.

6. In a back hoe excavator, the combination with a supporting platform, a boom pivotally mounted on said platform for swinging movement in a vertical plane and extending outwardly from the platform, a dipper with inwardly facing cutting element pivotally supported on and beneath an outer portion of said boom for swinging movement in a vertical plane and inward and outward movement toward and away from said platform, a mast supported by and extending above the platform, a drag line for reeving in said dipper and a pull-back line for elevating and lowering the boom with dipper, of mechanism constituted as a piston with rod, devices including a cylinder in which said piston is slidable, said devices coupling the piston with rod between said boom and mast, a reservoir for hydraulic fluid, a valve casing having first and second valve chambers, said casing being integral with said cylinder, a connection for flow of hydraulic fluid between said reservoir and said first chamber, a port to provide a passageway between said second chamber and the interior of said cylinder, a valve in said casing operable between a first position permitting flow of hydraulic fluid between said first chamber and second chamber and a second position shutting off such flow, first means responsive to tensioning of the pull-back line for actuating said valve to said first position, and second means operable in response to slacking off of said pull-back line for actuating said valve to said second position.

7. The combination as specified in claim 6 wherein said port extends through said casing and said cylinder to provide passageway between said second chamber and the interior of said cylinder.

8. In a back hoe excavator, the combination with a supporting platform, a boom pivotally mounted on said platform for swinging movement in a vertical plane and extending outwardly from the platform, a dipper with inwardly facing cutting element pivotally supported on and beneath an out portion of said boom for swinging movement in a vertical plane and inward and outward movement toward and away from said platform, a mast supported by and extending above the platform, a drag line for reeving in said dipper and a pull-back line for elevating and lowering the boom with dipper, of mechanism constituted as a piston with rod, devices including a cylinder in which said piston is slidable, said devices coupling the piston with rod between said boom and said mast, a reservoir for hydraulic fluid, a valve assembly having a first chamber and a second chamber mounted on said cylinder, a first connection for flow of hydraulic fluid between said reservoir and said first chamber, a second connection for flow of hydraulic fluid between said cylinder and said second chamber, a selector valve in said assembly operable between a first position permitting flow of hydraulic fluid between said first chamber and said second chamber and a second position shutting off said flow, a first passageway in said assembly for flow of hydraulic fluid from said first chamber to said second chamber, a check valve in said first passageway precluding flow of hydraulic fluid from said second chamber to said first chamber, a second passageway for flow of hydraulic fluid from said second chamber to said first chamber, a relief valve in said passageway that precludes flow from said second chamber to said first chamber until a predetermined pressure is reached in said second chamber and then permits such flow, first means responsive to tensioning of the pull-back line for actuating said selector valve to said first position, and second means operable in response to slacking off of said pull-back line for actuating said valve to said second position.

9. In a back hoe excavator, the combination with a supporting platform, a boom pivotally mounted on said platform for swinging movement in a vertical plane and extending outwardly from the platform, a dipper with inwardly facing cutting element pivotally supported on and beneath an outer portion of said boom for swinging movement in a vertical plane and inward and outward movement toward and away from said platform, a mast mounted on and extending above the platform, a drag line for reeving in said dipper and a pull-back line for elevating and lowering the boom with dipper, of mechanism on said mast and engageable with an intermediate portion of said boom for resisting upward pivotal movement of the boom caused by digging forces exerted on the cutting element of said dipper and means operable in response to slacking off of said pull-back line for rendering said mechanism operative to resist upward movement of said boom, said means being operable in response to tension in said pull back line for rendering said mechanism inoperative to resist upward movement of the boom.

10. The combination as specified in claim 9 wherein said mechanism includes a strut having rack teeth and said mechanism also includes a pinion gear that engages said rack teeth on said strut, coupling said strut between said mast and said boom.

11. The combination as specified in claim 10 wherein said pinion gear is drivingly mounted on a rotatable shaft, and said means operable in response to tension and slack in said pull-back line includes a brake drum drivingly fastened to said rotatable shaft, an independently mounted brake in adjacent relation to a portion of said brake drum, resilient means positioned to normally urge said brake into contact with said drum, a pivotally mounted frame connected to said brake, and a sheave being positioned to be engaged by said pull-back line when said pull-back line is tensioned thereby to move said frame to position to release said brake against the action of said resilient means, said sheave being released by said pull-back line when said pull-back line is slackened.

References Cited in the file of this patent

UNITED STATES PATENTS

| | | |
|---|---|---|
| 1,194,204 | Mahoney | Aug. 8, 1916 |
| 1,503,813 | Burke | Aug. 5, 1924 |
| 1,757,572 | Harry | May 6, 1930 |
| 1,772,451 | Downie | Aug. 12, 1930 |
| 2,873,871 | Waite | Feb. 17, 1959 |
| 2,874,489 | Orjala | Feb. 24, 1959 |
| 3,073,465 | Strand | Jan. 15, 1963 |